July 6, 1926.

J. W. BETTENDORF

BRAKE HANGER

Filed Nov. 6, 1925

INVENTOR
J. W. Bettendorf
BY Lloyd L. Evans
ATTORNEY

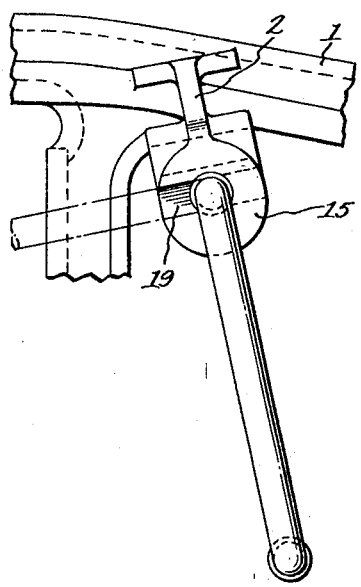
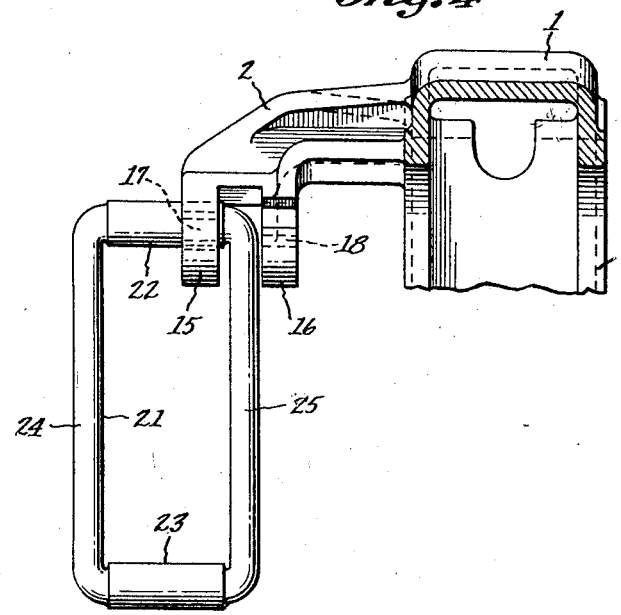
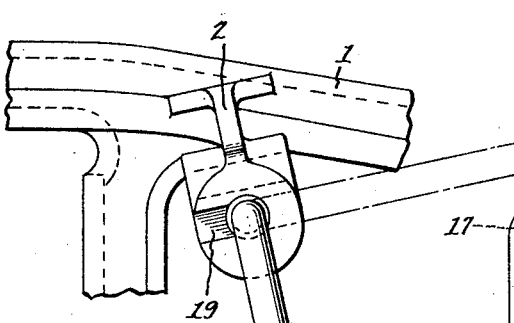
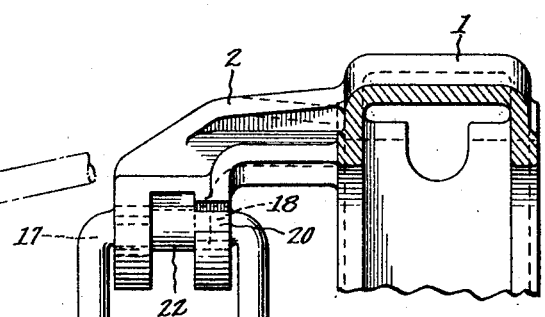
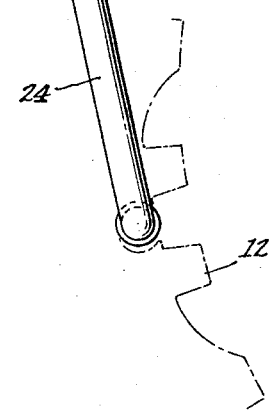

July 6, 1926.

J. W. BETTENDORF

BRAKE HANGER

Filed Nov. 6, 1925      3 Sheets-Sheet 3

1,591,504

INVENTOR
J. W. Bettendorf
BY Lloyd L. Evans
ATTORNEY

Patented July 6, 1926.

1,591,504

UNITED STATES PATENT OFFICE.

JOSEPH W. BETTENDORF, OF BETTENDORF, IOWA.

BRAKE HANGER.

Application filed November 6, 1925. Serial No. 67,260.

This invention relates to brake hanger mechanism, and more particularly to an improved brake hanger supporting means.

In railway brake hanger mechanism it is frequently desirable to remove and replace brake hangers when the car truck is in assembled relation. It is further desirable that a brake hanger should not become disengaged when in operating relation, and that the supporting means should provide bearing portions for the brake hanger for each direction of thrust longitudinal of said hanger.

An object of this invention is to provide a brake hanger supporting means with which a brake hanger may be readily assembled and disassembled.

Another object of the invention is to provide a brake hanger supporting means in which a bearing surface is provided for said brake hanger for each direction of thrust longitudinal of said hanger.

A further object of the invention is to provide a brake hanger supporting means comprising two spaced bearing portions in which a brake hanger may be securely positioned.

These and other objects of my invention will be apparent from the following description and annexed drawings in which:

Fig. 3 is an elevation similar to Fig. 1 showing a modified pair of bearing portions and a brake hanger having enlarged end portions partially assembled therewith;

Fig. 4 is a front elevation of the parts shown in Fig. 3;

Fig. 5 is a side elevation of the parts shown in Fig. 3 in fully assembled relation;

Fig. 6 is a front elevation of the parts shown in Fig. 5;

Figure 1:
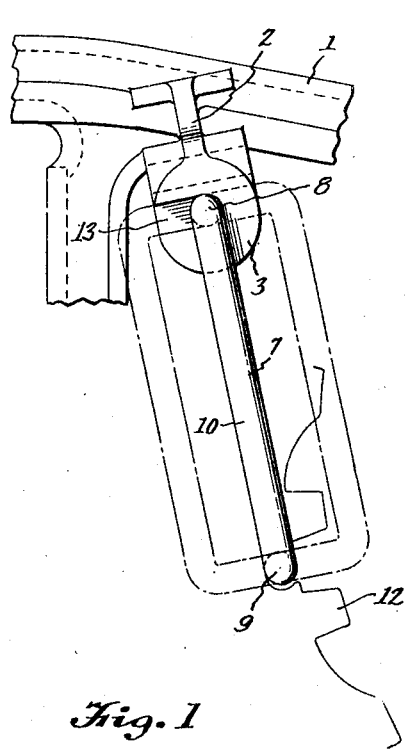
Figure 1 is a fragmentary side elevation showing a portion of a truck side frame, a brake hanger supporting bracket, a pair of spaced bearing portions according to my invention, and a brake hanger supported in said bearing portions.

In the drawings is shown a side portion of a railroad car truck frame 1, to which is integrally attached a brake hanger supporting bracket 2. In the form of my invention shown in Figs. 1 and 2, the bracket 2 is provided with depending spaced bearing portions 3 and 4 having respectively longitudinally aligned apertures 5 and 6, which are preferably circular in cross section. In said apertures 5 and 6 may be disposed in cooperating relation a brake hanger 7 comprising end portions 8 and 9 and sides 10 and 11. The end portion 9 is adapted to cooperate with a brake head 12, which in turn is adapted to cooperate with a brake shoe (not shown). Slots 13 and 14 are shown extending from the apertures 5 and 6 to the exterior of the respective bearing portions 3 and 4. The said slots 13 and 14 are preferably equal in width to the common diameter of the apertures 5 and 6, the said common diameter preferably being such that the brake hanger end 8 may be snugly engaged therein. The said slots 13 and 14 are longitudinally unaligned and preferably extend as shown in opposite directions and substantially perpendicularly to the normal operating position of the brake hanger 7 as shown in Fig. 1.

The space between the bearing portions 3 and 4 is preferably somewhat greater than the transverse dimension of the brake hanger end 8 for convenience in assembling, as will be hereinafter explained.

The brake hanger 7 is preferably of the closed rectangular loop type, and may be formed of any suitable material such as rolled or cast steel. With a brake hanger 7 as shown, a supporting means such as bearing portions 3 and 4 is particularly advantageous in that the brake hanger 7 may be assembled with or disassembled from the said bearing portions while the car truck is in assembled relation. Thus, the brake hanger 7 may be disposed in assembled relation with the bearing portions 3 and 4 by first placing said hanger in the position shown in the dotted lines in Figs. 1 and 2 with the brake hanger end 8 between the bearing portions 3 and 4 and in parallel alignment with the slots 13 and 14, and swinging the hanger 7 and the hanger end 8 about an intermediate transverse axis of the end 8 through the slots 13 and 14 into the bearing apertures 5 and 6. The hanger may be removed from the bearing portions 3 and 4 by the converse operation to that just described.

Figure 2:
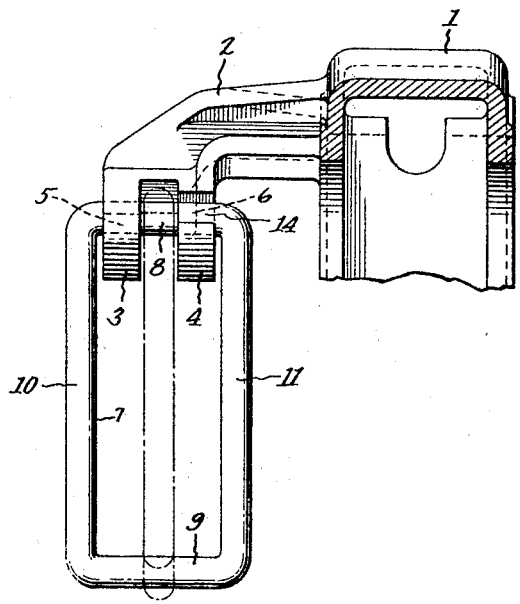
Fig. 2 is a fragmentary front elevation partly in section of the cooperating parts shown in Fig. 1.
Figure 7:
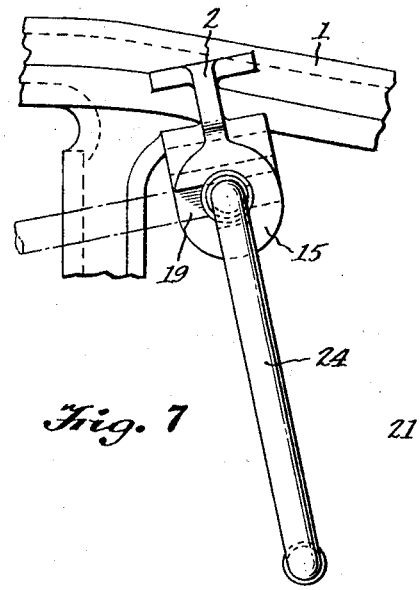
Fig. 7 is a side elevation showing a modified pair of bearing portions similar to that shown in Fig. 3 and a brake hanger provided with an end bushing in partially assembled relation therewith.
Figure 8:
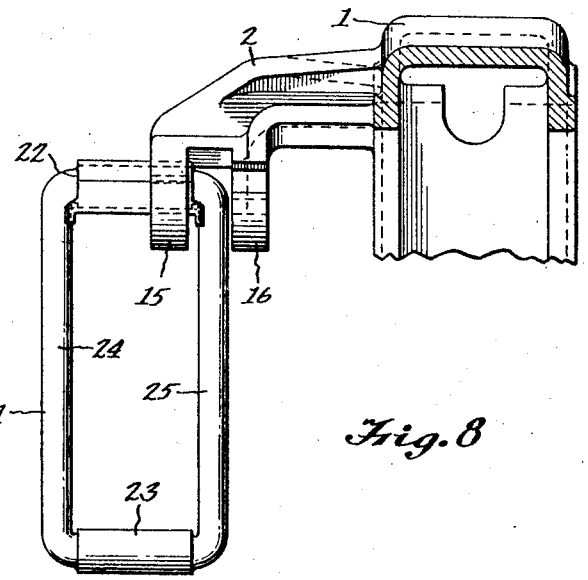
Fig. 8 is a front elevation of the parts shown in Fig. 7.

It will be noted in the embodiment of my invention shown in Figs. 1 and 2, the slots are so located that a bearing surface is provided for the brake hanger end 8 in the bearing portions 3 and 4 for each direction of thrust longitudinal of the hanger 7, the direction of said longitudinal thrust depending, in part, on the direction of rotation of car wheels being braked.

It will be seen in the construction shown in Figs. 1 and 2 that the brake hanger may be readily assembled with the bearing portions, and readily disassembled therefrom. The bearing portions are substantial, thereby providing long life, and when in assembled relation with said bearing portions, the brake hanger is secure against disassembly during the normal operation of the brake hanger mechanism.

It will be further noted that in order to provide for the easy assembly of the brake hanger and bearing portions and for the snug engagement of said brake hanger in said bearing portions, the space between the bearing portions, the width of the slots, and the diameter of the bearing apertures are preferably slightly greater than the width or diameter of the brake hanger end. To provide bearing surfaces for the brake hanger end for each direction of thrust longitudinal of the brake hanger, the slots preferably extend substantially perpendicularly to the normal operating position of the brake hanger.

In certain cases it may be desired to employ brake hangers having enlarged integral ends or ends provided with bushings rotatably locked with respect thereto, and it may also be desired to employ bearing portions having slots of less width than the diameter of the bearing apertures. Such modifications are shown in Figs. 3 to 11, which will be further described below.

Figure 9:
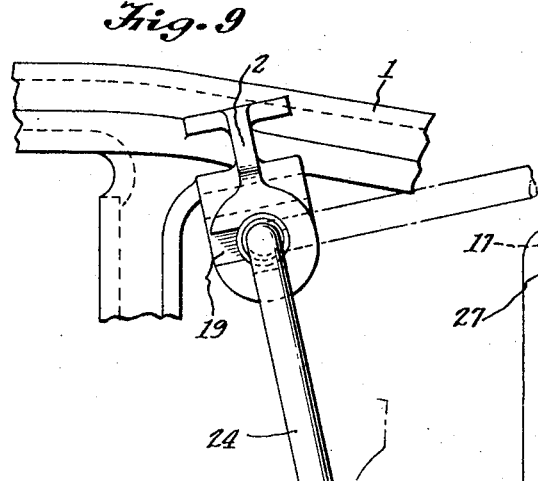
Fig. 9 is a side elevation of the parts shown in Fig. 7 in fully assembled relation.
Figure 10:
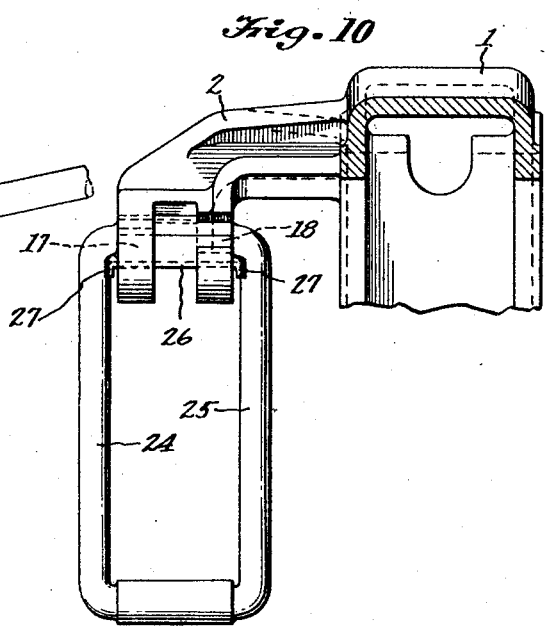
Fig. 10 is a front elevation of the parts shown in Fig. 9.
Figure 11:
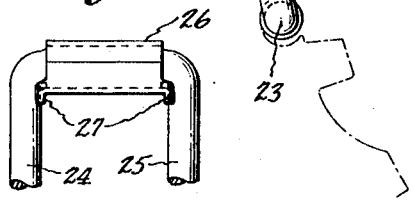
Fig. 11 is a fragmentary elevation of a portion of a brake hanger showing a bushing disposed about the end of said hanger and locked against rotation therewith.

In the spaced bearing portions 15 and 16 are provided apertures 17 and 18, which are longitudinally aligned and preferably substantially circular. Slots 19 and 20 extend outwardly from the apertures 17 and 18 to the exterior of the bearing portions 15 and 16. The said slots 19 and 20 are longitudinally unaligned and extend preferably in opposite directions and substantially perpendicularly to the normal operating position of the brake hanger 21 as shown in Figs. 5 and 9 so that a bearing surface will be provided in the said bearing portions for the cooperating end 22 of said brake hanger 21 for each direction of thrust longitudinal of said hanger. Said slots 19 and 20 are of less width than the diameter of the apertures 17 and 18 and are preferably substantially symmetrically disposed with respect to a plane passing through the common longitudinal axis of said aperture. The apertures 17 and 18 are preferably of such diameter to relatively snugly engage the end of the brake hanger.

The brake hanger 21 is preferably of a rectangular loop shape having ends 22 and 23, and sides 24 and 25. The ends 22 and 23 are shown as enlarged to give a heavier wearing section. End 22, adapted to be disposed within the apertures 17 and 18, may be provided with a replaceable bushing 26 locked against rotation with respect to said end 22 by means of ears 27 partially encompassing the adjacent sides 24 and 25. With such a bushing 26, relative movement takes place between the bushing and the walls of the apertures 17 and 18, whereby wear of the end 22 is prevented, thereby prolonging the life of the hanger 21. A bushing 26 may, of course, be employed also where the end 22 is not enlarged. Where such bushing is employed the apertures 17 and 18 are made of such diameter to accommodate the hanger end and bushing.

One of the brake hanger sides, such as side 25, preferably has a sufficiently large transverse dimension adjacent to the end 22 to enable said side to pass longitudinally through the slots 19 and 20. Both sides 24 and 25 may, of course, be of uniform diameter and adapted to pass through the slots.

The brake hanger 21 may be assembled with the bearing portions 15 and 16 by placing said brake hanger adjacent to the aperture 17 with the end 22 in longitudinal alignment therewith and the sides 24 and 25 parallel to and adjacent the slot 17, moving the hanger toward and longitudinally of the aperture 17 until the side 25 is disposed between the bearing portions 15 and 16, swinging the hanger 21 about the end 22 as a pivot until the sides 24 and 25 are parallel to and adjacent the slot 18 and moving the hanger towards and longitudinally of said aperture 18 until the side 24 is disposed therebeyond. In assembled relation the sides 24 and 25 are disposed on the opposed sides of bearing portions 15 and 16. It may be noted that the space between the bearing portions 15 and 16 is sufficient to permit the brake hanger side 25 to be disposed therein during the assembly of the brake hanger with the bearing portions.

It will be seen that where the slots 19 and 20 are of less width than the diameter of the apertures 17 and 18, and the brake hanger end 22 is enlarged, the brake hanger is securely positioned against removal from the apertures. In the constructions shown, furthermore, bearing surfaces are provided for the cooperating hanger end 22 for each direction of thrust longitudinal of the hanger when the hanger is in normal operating position.

It is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. A brake hanger support comprising a pair of spaced bearing portions having aligned, substantially circular, bearing apertures, adapted to provide bearing surfaces for each direction of thrust longitudinal of a brake hanger, a slot in each bearing portion extending from the bearing aperture to the exterior of the bearing portion, said slots being longitudinally unaligned, the sides of each slot being substantially symmetrically disposed with respect to a plane passing through the common longitudinal axis of said apertures.

2. A brake hanger support comprising a pair of spaced bearing portions having aligned bearing apertures substantially circular in cross section, a slot in each bearing portion extending from the bearing aperture to the exterior of the bearing portion, said slots extending in opposite and substantially parallel directions from the common axis of said bearing aperture, the sides of each slot being substantially symmetrically disposed with respect to a plane passing through the common longitudinal axis of said apertures.

3. A brake hanger support comprising a pair of spaced bearing portions having aligned bearing apertures substantially circular in cross section, a slot in each bearing portion extending from the bearing aperture to the exterior of the bearing portion, said slots extending in opposite and substantially parallel directions from the common axis of said bearing apertures, said slots being narrower in width than the diameter of said apertures, the sides of each slot being substantially symmetrically disposed with respect to a plane passing through the common longitudinal axis of said apertures.

4. In brake mechanism, the combination of a brake hanger and a brake hanger support therefor comprising a pair of spaced bearing portions having aligned bearing apertures adapted to receive one end of a brake hanger, longitudinally unaligned slots extending from the bearing apertures to the exterior of the bearing portions, said slots being disposed so that a bearing surface will be provided in the bearing portions for the cooperating end of said brake hanger for each direction of thrust longitudinal of said hanger.

5. In brake mechanism, the combination of a brake hanger and a brake hanger support therefor comprising a pair of spaced bearing portions having aligned bearing apertures substantially circular in cross section and adapted to receive one end of a brake hanger, longitudinally unaligned slots extending from the bearing apertures to the exterior of the bearing portions, said slots being of less width than the diameter of said apertures and disposed so that a bearing surface will be provided in the bearing portions for the cooperating end of said brake hanger for each direction of thrust longitudinal of said hanger, one of the sides of said brake hanger directly adjacent said cooperating end having such transverse dimension to enable said side to pass longitudinally within said slots.

6. In brake mechanism, the combination of a brake hanger, and a brake hanger support therefor, comprising a pair of spaced bearing portions having aligned bearing apertures substantially circular in cross section adapted to receive one end of said brake hanger, each bearing portion having a slot extending from the bearing portion, each of said slots being substantially symmetrically disposed with respect to a plane passing through the common longitudinal axis of said apertures, said slots extending in opposite directions and substantially perpendicularly to the normal operating position of said brake hanger, so that a bearing surface will be provided in the bearing portions for the cooperating end of said brake hanger for each direction of thrust longitudinal of said hanger.

7. In brake mechanism, the combination of a brake hanger having a bushing disposed about an end thereof and locked against rotation with respect thereto, and a brake hanger support therefor comprising a pair of spaced bearing portions having aligned bearing apertures substantially circular in cross section and adapted to receive the said end of the brake hanger, each bearing portion having a slot extending from the bearing aperture to the exterior of the bearing portion, each said slot being of less width than the diameter of said apertures and being substantially symmetrically disposed with respect to a plane passing through the common longitudinal axis of said apertures, said slots extending in opposite directions and substantially perpendicularly to the normal operating position of said brake hanger so that a bearing surface will be provided in the bearing portions for the cooperating end of said brake hanger for each direction of thrust longitudinal of said hanger, said apertures being adapted to snugly engage said end of the brake hanger, one of the sides of said brake hanger directly adjacent said cooperating end having such transverse dimension to enable said side to pass longitudinally within said slots.

8. In brake mechanism, the combination of a brake hanger and a brake hanger support therefor comprising a pair of spaced bearing portions having aligned bearing apertures substantially circular in cross section, each bearing portion having a slot extending from the bearing aperture to the exterior of the bearing portion, each said slot being substantially symmetrically disposed with respect to a plane passing through the common longitudinal axis of said apertures, said slots extending in opposite directions and substantially perpendicularly to the normal operating position of said brake hanger so that a bearing surface will be provided in the bearing portions for the cooperating end of said brake hanger for each direction of thrust longitudinal of said hanger, said hanger being disposed in said bearing portions by placing said hanger with an end thereof between said bearing portions and in parallel alignment with said slots, and swinging said hanger about an intermediate longitudinal axis thereof through said slots and into said bearing apertures.

9. In brake mechanism, the combination of a brake hanger having ends and sides, and a brake hanger support having a pair of longitudinally aligned bearing apertures and longitudinally unaligned slots extending outwardly therefrom, an end of said brake hanger being adapted to be disposed in said apertures by placing said brake hanger adjacent to one of said apertures with said end in longitudinal alignment therewith and one of said sides parallel to and adjacent the slot thereof, moving said hanger toward and longitudinally of said aperture until said side is disposed between the bearing portions, swinging said hanger about said end until said side is parallel to and adjacent the slot of the second bearing portion, and moving said hanger toward and longitudinally of said second aperture until said first side is disposed therebeyond.

In testimony whereof I affix my signature.

JOSEPH W. BETTENDORF.